United States Patent [19]

Smith

[11] Patent Number: 4,690,418

[45] Date of Patent: Sep. 1, 1987

[54] STEERING KNUCKLE AND KINGPIN ASSEMBLY

[75] Inventor: Joseph E. Smith, Birmingham, Mich.

[73] Assignee: V. W. Kaiser Engineering, Inc., Millington, Mich.

[21] Appl. No.: 731,556

[22] Filed: May 7, 1985

[51] Int. Cl.⁴ .............................................. B60G 3/02
[52] U.S. Cl. .................................. 280/96.1; 280/660
[58] Field of Search ................... 280/93, 96.1, 96.2; 188/18; 29/447

[56] References Cited

U.S. PATENT DOCUMENTS

| | | | |
|---|---|---|---|
| 2,197,273 | 4/1940 | Lindeman | 280/93 |
| 2,913,251 | 11/1959 | Herbenar | 280/96.1 |
| 3,240,509 | 3/1966 | Pierce | 280/96.1 |
| 3,801,124 | 4/1974 | Afanador et al. | 280/93 |
| 4,043,567 | 8/1977 | Kaiser | 280/96.1 |
| 4,229,017 | 10/1980 | Hagedorn | 280/96.1 |
| 4,286,799 | 9/1981 | Ayres | 280/96.1 |

Primary Examiner—Richard A. Bertsch
Attorney, Agent, or Firm—Krass & Young

[57] ABSTRACT

A steering kingpin and knuckle assembly provided with wear take-up by forming the kingpin end portions with a frusto-conical peripheral surface, and providing a bearing bushing having a corresponding frusto-conical internal bearing surface mounted in each steering knuckle yoke bore and pivotally supporting the knuckle relative to the kingpin. Alternatively, the kingpin end portions and the internal surface of the bushing, preferably split bushing, are cylindrical and the bushing external surface is frusto-conical and disposed in a frusto-conical bore in the knuckle yoke. The bushing is preloaded in a direction causing engagement of the kingpin end and bushing bearing surfaces, being spring-biased or, in the alternative, by an end cap closing the yoke bore and having an annular position projecting within the bore. Shims are added between the end cap annular projecting portion and the bushing end face, or shims are removed from under the end cap mounting flange, for displacing the tapered bushing in a direction causing engagement of the bearing surfaces, and thus compensating for wear tending to increase the clearance between the bearing surfaces.

21 Claims, 9 Drawing Figures

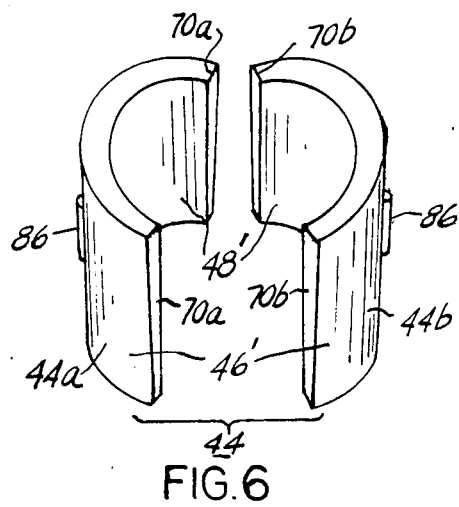
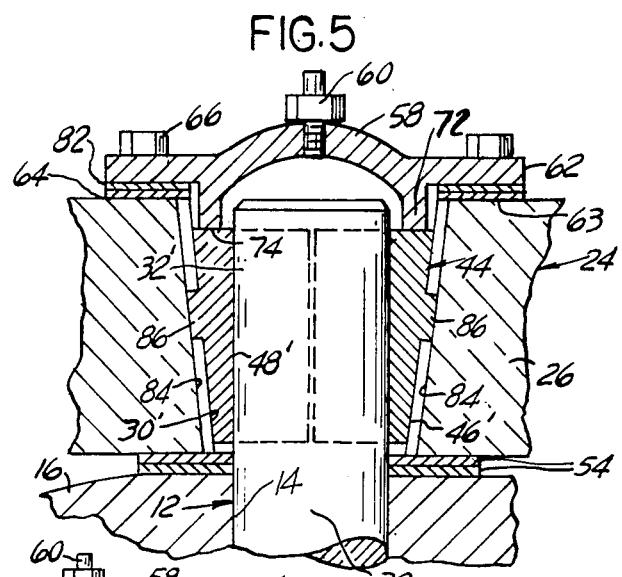
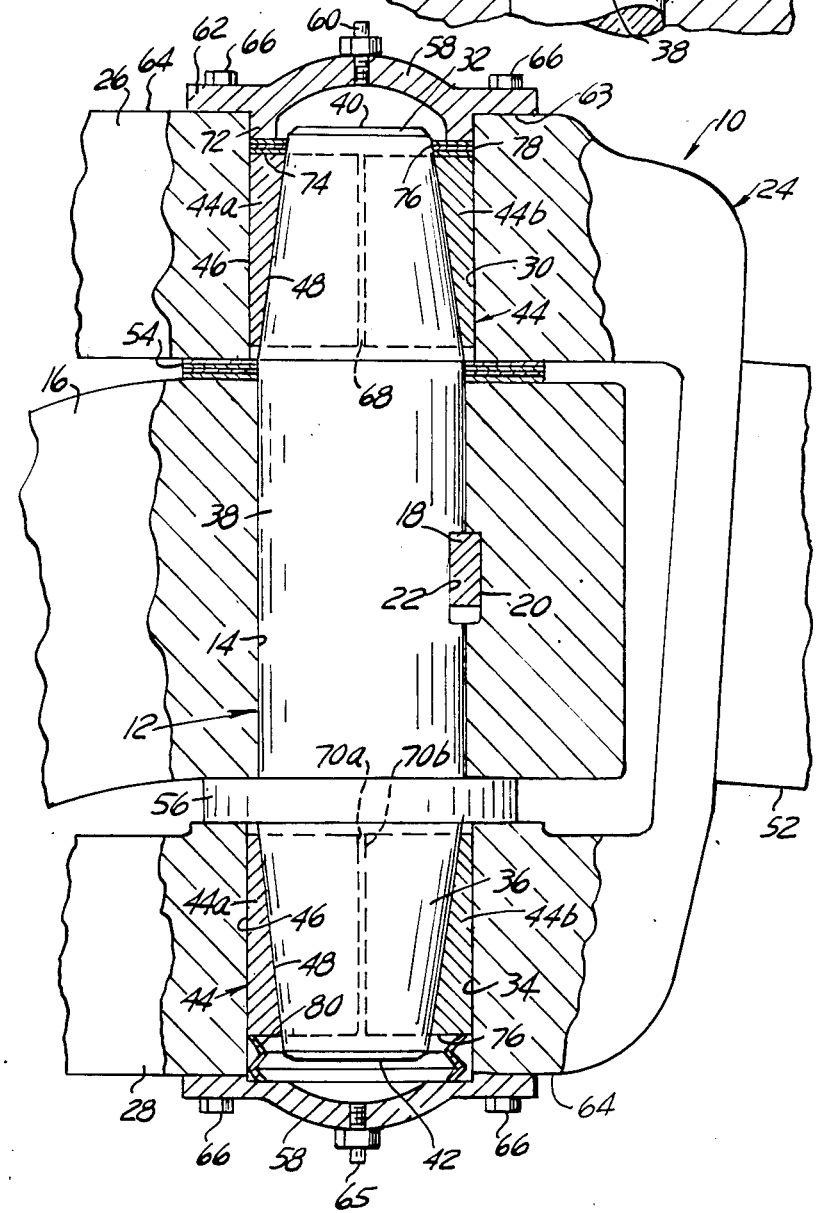

STEERING KNUCKLE AND KINGPIN ASSEMBLY

CROSS-REFERENCE TO RELATED APPLICATION

The present application is being filed contemporaneously with application Ser. No. 731,557, assigned to the same assignee, now U.S. Pat. No. 4,635,952.

BACKGROUND OF THE INVENTION

The present invention relates to steering knuckle and kingpin assemblies in general, and more particularly to steering knuckle and kingpin assemblies having pivot bushings adjustable for wear take-up.

Motor vehicle steering kingpins and kingpin bearings or bushings are subject to wear. When wear exceeds acceptable limits, it becomes necessary to either replace the kingpin or the bushings supporting the kingpin of the steering knuckle assembly, or preferably to replace both as a set. Such wear is particularly pronounced in heavy motor vehicles, such as trucks and the like, which are subjected to heavy service for substantially long periods of time, and it is not uncommon to replace heavy truck steering knuckle assemblies several times during the useful life of the vehicles.

SUMMARY OF THE INVENTION

The present invention provides a motor vehicle steering knuckle and kingpin assembly having knuckle bearings or bushings which are adjustable, even in the field, to compensate for wear until the kingpin or the bushings, or both, are no longer serviceable. In an example of structure of the invention, adjustment for compensating for the wear of the steering knuckle kingpin and knuckle bushings is effected manually and, in another example of structure according to the invention, means are provided for pre-loading the knuckle bushings such as to automatically compensate for wear.

The many objects and advantages of the present invention will become apparent to those skilled in the art when the following description of the best modes contemplated for practicing the invention is read in conjunction with the accompanying drawing wherein like reference numerals refer to like or similar parts, and in which:

BRIEF DESCRIPTION OF THE DRAWING

FIG. 2 is a view at an enlarged scale of a portion of the structure of FIG. 1;

FIG. 5 is a view similar to FIG. 3 and showing a further modification of the invention; and FIG. 6 is a perspective view of the bushing included in the structure of FIG. 5.

DETAILED DESCRIPTION OF THE PREFERRED EMBODIMENTS

Figure 1:
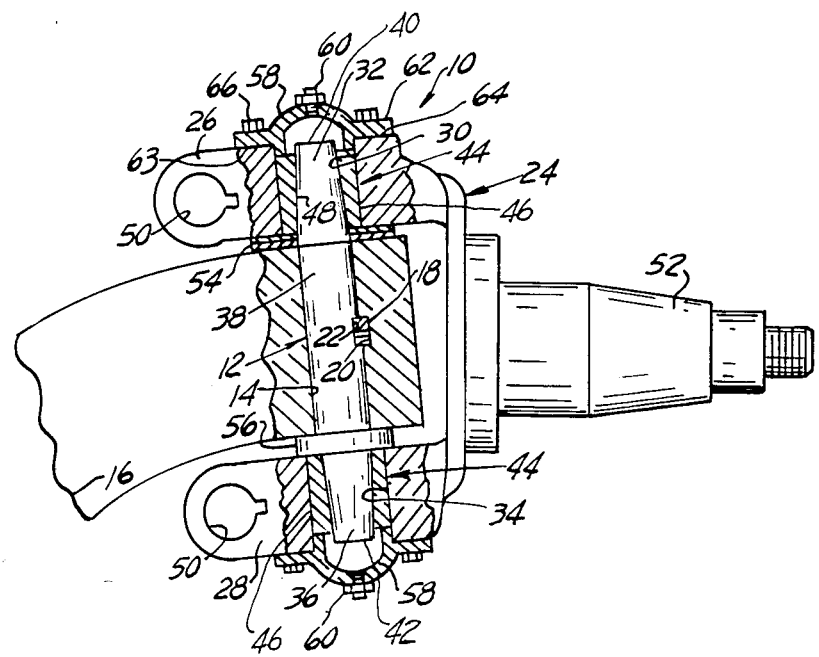
FIG. 1 is a schematic illustration of an example of structure for a steering knuckle and kingpin assembly provided with a kingpin and bushing structure according to the present invention.

Referring to the drawing and more particularly to FIGS. 1 and 2, there is illustrated a steering knuckle and kingpin assembly 10 comprising a kingpin 12 affixed through a bore 14 in opposite ends of the rigid front axle or beam 16 of a motor vehicle, not shown, such as a heavy duty truck for example. The kingpin 12 is mounted through the bore 14 at a slight angle to the vertical by means of a tapered lock pin 18 pressed through a tapered channel 20 through the axle or beam 16 and a corresponding straight notch 22 formed on the periphery of the kingpin 12. In this manner the kingpin 12 is held in the bore 14 against rotation and against vertical displacement along its longitudinal axis.

A wheel spindle knuckle 24 is pivotally mounted relative to the kingpin 12 by way of two integral upper and lower yoke members 26 and 28, the upper yoke member 26 having a bore 30 accepting the upper end portion 32 of the kingpin 12, while the lower yoke member 28 of the wheel spindle knuckle 24 is similarly provided with a bore 34 surrounding the kingpin lower end portion 36. The upper end portion 32 of the kingpin 12 and the lower end portion 36 of the kingpin 12 are frusto-conical, or tapered, having an outer diameter progressively decreasing from the portion 38 of the kingpin 12 mounted in the bore 14 of the axle or beam 16 to the end face 40 and 42 of respectively the kingpin end portion 32 and end portion 36. A bearing or bushing 44 is disposed in the upper yoke bore 30 for pivotably supporting the upper yoke member 26 around the kingpin upper end portion 32, and a similar bearing or bushing 44 is disposed in the lower yoke bore 34 between the bore surface and the lower end portion 36 of the kingpin 12. The peripheral surface 46 of each bushing 44 is circularly cylindrical such as to fit in the yoke bore 30 or 34, while the internal surface 48 of each bushing 44 is tapered at a taper angle corresponding to that of the tapered end portions 32 and 36 of the kingpin 12.

Two wheel spindle knuckles 24, one on each end of the axle or beam 16, are coupled for simultaneous pivoting by an appropriate tie rod, not shown, generally provided with a ball and socket joint at each end, the ball, for example, having a stud fastened through an appropriate opening 50 at one of the yoke members, FIG. 1, while another tie rod displaced by the steering mechanism of the vehicle, not shown, is attached at its end by way of a stud fastened through another opening 50 disposed in the other yoke member.

The upper and lower yoke members 26 and 28 are integral parts of a single-piece forging, for example, and they form a generally U-shaped member supporting the spindle 52 of a steerable road wheel, not shown. A plurality of annular spacers shims 54 are mounted around the kingpin 12 where it projects on the top of the axle or beam 16 to provide appropriate clearance between the upper yoke member 26 and the axle or beam 16, while an annular thrust bearing 56 is disposed around the kingpin 12 where it projects below the axle or beam 16, the thrust bearing 56 transmitting the load from the axle or beam 16 to the lower yoke member 28. The upper end of the upper yoke bore 30 is closed by an end cap 58, provided at its center with a one-way check valve 60 and having a mounting flange 62 forming an annular surface 63 engaging the surface 64 of the upper yoke 26 surrounding the end of the bore 30 and held by means of bolts, such as bolts 66. The end of the lower yoke bore 34 is similarly closed by an end cap 58 also provided with a one-way check valve 60 and a mounting flange 62 having an annular surface 63 engaged with the surface 64 of the lower yoke 28 around the edge of the end of the lower yoke bore 34. The check valves 60 permits visual observation of the escape of lubricant introduced through grease fittings, not shown, permitting lubrication of the kingpin end portions 32 and 36 and the bearing surfaces of the bushings 44. When lubricant is observed to flow through the check valves 60, it is an indication that the kingpin-yoke assembly 10 has been fully lubricated. Alternatively, in some structures, the check valves 60 are omitted and replaced by grease fittings through which lubricant is supplied to the bearings of the kingpin-knuckle assembly 10.

The internally tapered bushings 44 may be made of spirally wound tool steel or spring steel material as disclosed in U.S. Pat. No. 4,043,567 for Steering Axle Assembly, issued Aug. 23, 1977, and in application Ser. No. 664,362, filed Oct. 23, 1984 for Helically Wound Bushing. Alternatively, and as illustrated, the bushings 44 may be plain bushings made of steel, bronze, plastic or other bearing material, made in a single piece, not shown, or made in a single piece with a longitudinal slit, FIG. 4a, forming a gap 68 between the side surfaces 70a and 70b of the slit.

Figure 4A:
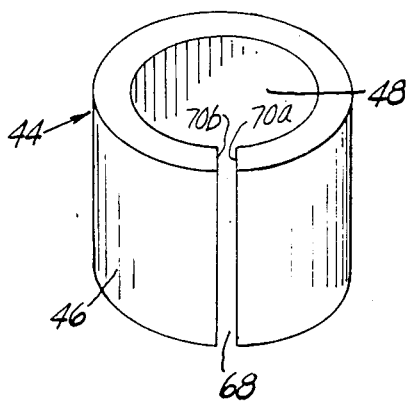
FIGS. 4(a)–4(d) are perspective views of bearings or bushings according to the invention.

The slit bushings to FIG. 4a present the advantage of more flexibility and, when made with an outer diameter slightly larger than the diameter of the yoke bores 30 and 34 they are held in the bores by frictional engagement of their peripheral surface 46 with the surface of the bore 30 or 34.

Figure 4B:
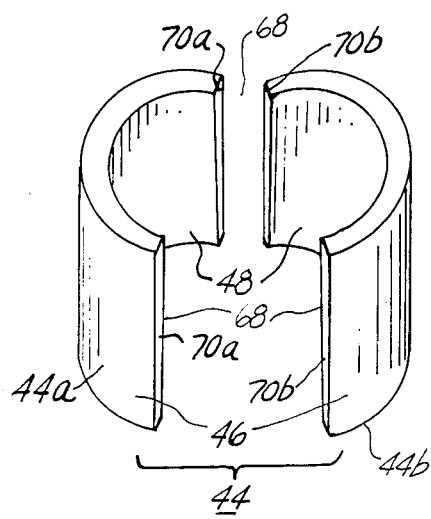

The internally tapered bushings 44, may also be made in two sections or half shells 44a and 44b, as best shown at FIG. 4(b). When disposed between the bore 30 or 34 and the tapered kingpin end portion 32 or 36, FIG. 2, the two half shells 44a and 44b are separated by a narrow longitudinal gap 68 between the side surfaces 70a and 70b of the two half shells 44a and 44b, two such gaps 68 being formed across a diameter of the full bushing 44. When disposed between the bore 30 or 34 and the tapered kingpin end portion 32 or 36, FIG. 2, the slit bearing 44, FIG. 4a, presents a single gap 68 between the side surfaces 70a and 70b of the slit. The gaps 68 effectively act as lubricant distribution channels, although it will be appreciated that additional lubricant distribution channels, in the form of crossed grooves, not shown, may be formed on the internal surface 48 of the bushings 44 or on the peripheral surface of the kingpin end portions 32 and 36, or on both.

Figure 4C:
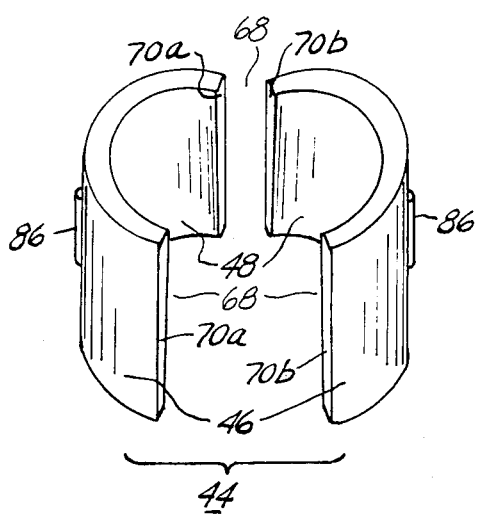
Figure 4D:
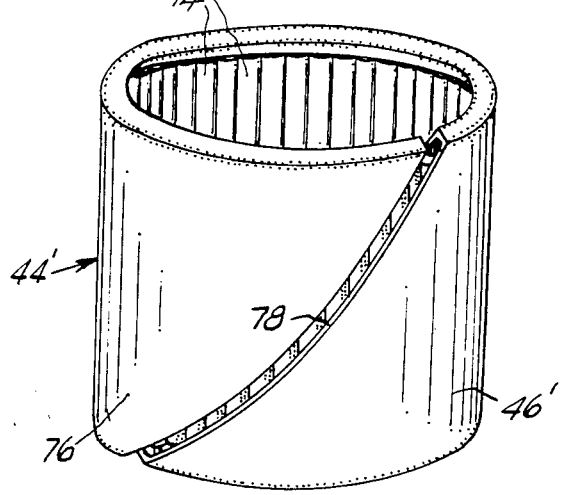

The internally tapered bushings may also consist of a needle bearing, for example, as shown at 44' at FIG. 4d. The needle bearing 44' is conventional, in all respects except that the needles 74, instead of being perfectly cylindrical, are provided with a slight taper. The housing or shell 76 which provides the race on which the needles 74 roll and which defines the peripheral surface 46' disposed in the upper or lower yoke bore 30 or 34 is preferably provided with an inclined slit 78 which, when providing an outer diameter for the bearing 44' slightly larger than the inner diameter of the yoke bore 30 or 34 permits the bearing 44' to be held frictionally within the yoke bore 30 or 34, and acts as a grease channel to supply lubricant to the needles 74 without interfering with the rolling of the needles on the surface of the race.

As the tapered kingpin end portions 32 and 36 wear and as the internal tapered surface 48 of the bushings 44 simultaneously and progressively wears, a certain amount of play appears between the bearing surfaces in rotationally sliding engagement. Compensating for the wear is provided, in an example of structure according to the invention illustrated in detail in the portion of FIG. 2 relating to the assembly of the upper knuckle yoke 26 and upper kingpin end portion 32, by forming the end caps 58 closing the upper yoke bore 30 with an internally projecting annular integral portion 72 terminating in an annular abutment face 74 disposed above the annular end face 76 of the bushing 44, and placing an annular shim 78 of a predetermined thickness between the end cap annular abutment surface 74 and the bushing annular end face 76. Taking up the wear requires simply the removal of the end cap 58, by unscrewing the mounting bolts 66, inserting one or more annular shims 78 within the yoke bore 30, reinstalling the end cap 58 over the end of the bore 30 and tightening the bolts 62. This causes the bushing 44 to be driven downwardly within the bore 30 such as to reduce or completely take up the clearance between the tapered inner surface 48 of the bushing 44 and the tapered peripheral surface of the kingpin end portion 32. The same arrangement may be provided for the assembly of the lower knuckle yoke 28 and kingpin lower end portion 36.

FIG. 2 further illustrates, however, a modification of the invention providing automatic wear take-up for the kingpin lower end portion 36 and the bushing 44 installed in the bore 34 of the lower yoke 28. A spring pre-load is provided between the inner surface of the end cap and the annular end face 76 of the bushing 44 in the form, for example, of one or more dished annular springs 80 of the Belleville-type. As the bearing surfaces wear, the internally tapered bushing 44 is urged more deeply within the yoke bore 34 by the pre-load force provided by the Belleville-type springs 80, thus preventing play due to wear from taking place. Other pre-load means may be used, such as a strong zig-zag spring, a compressed coil spring, a compressed elastomeric ring, and the like.

Figure 3:
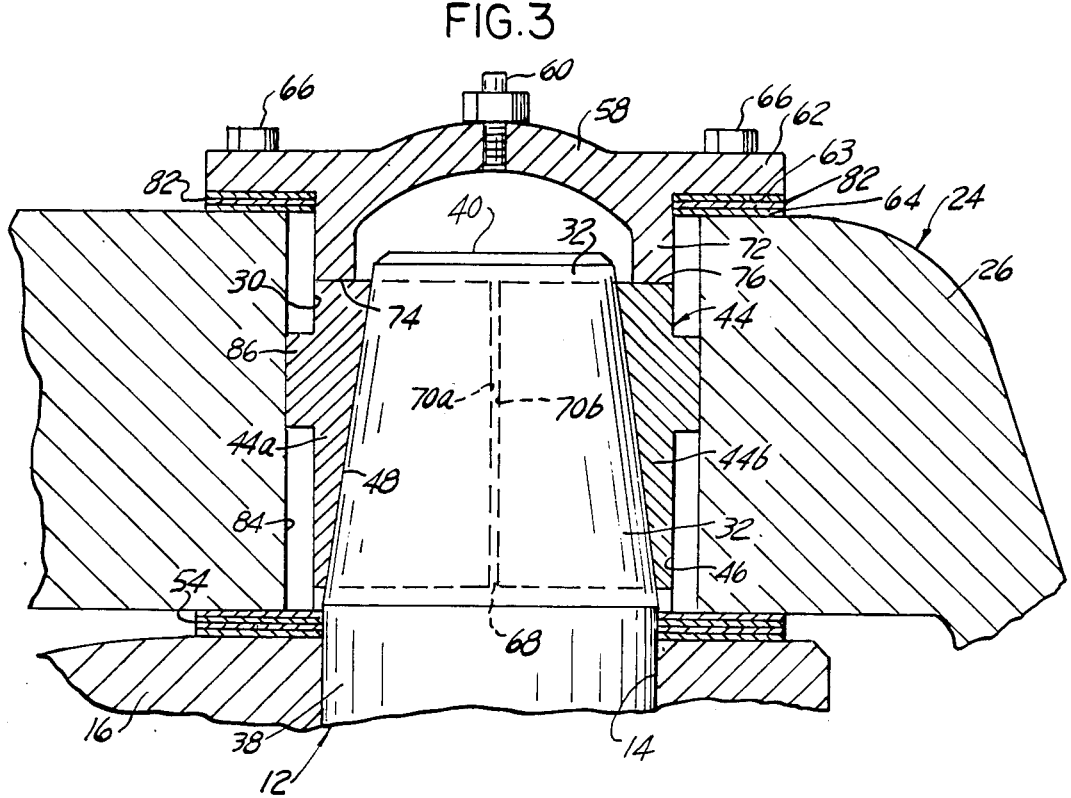
FIG. 3 is a fragmentary view similar to FIG. 2, and showing a modification of the invention.

FIG. 3 illustrates another embodiment for manually adjusting an internally tapered bushing 44 cooperating with a kingpin tapered end portion such as the kingpin upper end portion 32, for example, although it will be appreciated that the same structure can be used for providing wear compensation for the lower knuckle yoke and kingpin lower end portion assembly. The end cap 58, in the structure of FIG. 3, is also provided with an internal projecting annular portion 72 terminating in an annular face 74. The annular abutment face 74 and the annular end face 76 of the bushing 44 are in mutual engagement and a plurality of thin shims 82 are disposed between the annular face 63 of the end cap mounting flange 62 and the corresponding support surface 64 of the upper yoke member 26. As the bearing surfaces of the kingpin end portion 32 and bushing 44 wear, the play caused by wear is taken up by removing the end cap 58 and removing one or more shims 82, such that when the end cap 58 and bolts 66 are reinstalled, and the bolts 66 are tightened, the abutment annular surface 74 pushes the bushing 44 downwardly, thus re-engaging the tapered internal bearing surface 48 of the bushing 44 with the peripheral tapered surface of the kingpin end portion 32. The same arrangement may evidently be used for wear compensation of the knuckle yoke and kingpin lower portion assembly, or any of the structures illustrated at FIG. 2.

The bushing 44, more particularly when made of two half shells 44a and 44b, may be provided with appropriate means preventing rotation of the half shells 44a and 44b relative to the yoke bores 30 and 32 in which they are held, such as, for example, by providing the bushing 44 and the bore 30 or 34 with a spline-like coupling in the form of a longitudinal groove 84, FIG. 3, in the wall of the yoke bore in which is engaged an intergral key 86 projecting from the peripheral cylindrical surface 46 of the bushing 44, FIG. 4c.

Instead of providing the kingpin 12 with peripherally tapered end portions, the kingpin 12 may be provided with cylindrical end portions, as illustrated at FIG. 5 with respect to the kingpin upper end portion 32'. The knuckle yoke bushing 44 has a correspondingly cylindrical internal surface 48', and a tapered or frusto-conical peripheral surface 46' disposed in a tapered bore 30'. Wear between the bearing surfaces is taken up by removing the end cap 58, and reinstalling the end cap after removing one or more of the adjustment shims 82 originally installed between the mounting surface 63 of the end cap flange 62 and the mounting surface 64 of the knuckle yoke 26. The abutment annular surface 74 of the end cap annular portion 72 engaging the annular end face 76 of the bushing 44 causes controlled downward displacement of the bushing which, through the interreaction between the bushing tapered peripheral surface 46' and the tapered internal surface of the bore 30', causes diametral contraction of the bushing 44, thus urging the internal cylindrical surface 48' of the bushing in engagement with the peripheral cylindrical surface of the kingpin end portion 32'.

Wear takeup through longitudinal displacement of the exteriorly tapered bushing 44 may also be effected according to the previously described embodiments of the invention, such as by placing annular shims between the end face 76 of the bushing 44 and the annular face 74 of the end cap annular portion 72, or by means of appropriate springs placed between the end cap lower surface and the end face 76 of the bushing. It will, however, be appreciated that whether the bushing 44 is made of two half-shells, as illustrated at FIG. 6, or is made as a single piece bushing with a longitudinal slit, the material of which the bushing 44 of FIG. 5 is made must be such as to permit elastic or plastic diametral contraction of the bushing.

FIGS. 5-6 further illustrate an example of structure wherein the bushing 44 and the yoke bore 30' are provided with a spline-like arrangement consisting of a key-like projection 86 on its peripheral surface 46' engaged in a keyway groove 84 in the surface of the tapered bore 30', and preventing rotation of the bushing half shells 44a and 44b within the bore 30'.

It will be appreciated that the conventional bevel illustrated at the end of the kingpin end portions, although quite suitable in structure wherein the kingpin end portions project beyond the end face 76 of the bushings 44, is advantageously replaced by a radiused edge to prevent the edge effect discussed in detail in the co-pending application Ser. No. 731,557 more particularly in structures wherein the kingpin end portion tips do not project beyond the bushing end face.

Having thus described the present invention by way of examples of structure given for illustrative purpose only, modifications whereof will be apparent to those skilled in the art, what is claimed as new is as follows:

1. A steering knuckle and kingpin assembly comprising a kingpin, means for fixedly mounting said kingpin on a support member, said kingpin having an upper end portion and a lower end portion, a wheel spindle knuckle pivotally mounted relative to said kingpin, said wheel spindle knuckle having an integral upper yoke having a bore disposed around said kingpin upper end portion and an integral lower yoke having a bore disposed around said kingpin lower end portion, a pair of bushings disposed in each of said bores in said yokes, at least one of said bushings having a peripheral surface fitted in said bore and an internal surface forming a bearing surface in engagement with one of said kingpin end portions, and means for compensating for an increase in clearance between said bearing surfaces due to wear by displacing said bushing longitudinally in a direction that causes said bushing internal surface to be urged toward engagement with said kingpin end portion, wherein at least one of said kingpin end portions has a frusto-conical peripheral surface and corresponding bushing has a cylindrical peripheral surface fitted in a cylindrical bore in a yoke and a frusto-conical internal surface forming said bearing surface with said kingpin end portion.

2. The steering knuckle and kingpin assembly of claim 1 wherein said wear clearance compensating means comprises spring bias means constantly urging said bushing in the direction urging said bushing bearing surface toward engagement with said kingpin end portion.

3. The steering knuckle and kingpin assembly of claim 2 wherein a cap is mounted over said bore for closing said bore, and wherein said spring bias means is disposed between said cap and an end of said bushing.

4. The steering knuckle and kingpin assembly of claim 3 wherein said spring bias means is at least one Belleville-type spring.

5. The steering knuckle and kingpin assembly of claim 1 wherein said wear clearance compensating means comprises a cap closing said yoke bore, said cap having an annular portion projecting in said bore in abutting engagement with an end of said bushing and at least one annular shim engageable between said cap annular portion and said bushing end for displacing said bushing in said bore in a direction causing engagement of said bushing bearing surface with said kingpin end portion when said cap is mounted over said bore.

6. The steering knuckle and kingpin assembly of claim 1 wherein said wear clearance compensating means comprises a cap closing said yoke bore, said cap having an annular portion projecting in said bore in abutting engagement with an end of said bushing, and at least one shim disposed between a mounting surface of said cap and a surface of said yoke, said shim being removable for taking up said wear clearance by causing said cap annular portion to engage said bushing end for displacing said bushing in a direction causing engagement of said bushing bearing surface with said kingpin end portion when said cap is reinstalled over said bore.

7. The steering knuckle and kingpin assembly of claim 1 wherein said one of said bushings is a plain bushing.

8. The steering knuckle and kingpin assembly of claim 1 wherein said one of said bushings is a needle bearing.

9. The steering knuckle and kingpin assembly of claim 8 wherein said needle bearing has a housing forming a peripheral race for the needles, and said housing has a slit at an angle, to the longitudinal axis of said bearing.

10. A steering knuckle and kingpin assembly comprising a kingpin, means for fixedly mounting said kingpin on a support member, said kingpin having an upper end portion and a lower end portion, a wheel spindle knuckle pivotally mounted relative to said kingpin, said wheel spindle knuckle having an integral upper yoke having a bore disposed around said kingpin upper end portion and an integal lower yoke having a bore disposed around said kingpin lower end portion, a pair of bushings disposed in each of said bores in said yokes, at least one of said bushings having a peripheral surface fitted in said bore and an internal surface forming a bearing surface in engagement with one of said kingpin end portions, and means for compensating for an increase in clearance between said bearing surfaces due to wear by displacing said bushing longitudinally in a direction that causes said bushing internal surface to be urged toward engagement with said kingpin end portion, wherein said wear clearance compensating means comprises a cap closing said yoke bore, said cap having an annular portion projecting in said bore in abutting engagement with an end of said bushing and at least one annular shim engageable between said cap annular portion and said bushing end for displacing said bushing in said bore in a direction causing engagement of said bushing bearing surface with said kingpin end portion when said cap is mounted over said bore.

11. A steering knuckle and kingpin assembly comprising a kingpin, means for fixedly mounting said kingpin on a support member, said kingpin having an upper end portion and a lower end portion, a wheel spindle knuckle pivotally mounted relative to said kingpin, said wheel spindle knuckle having an integral upper yoke having a bore disposed around said kingpin upper end portion and an integral lower yoke having a bore disposed around said kingpin lower end portion, a pair of bushings disposed in each of said bores in said yokes, at least one of said bushings having a peripheral surface fitted in said bore and an internal surface forming a bearing surface in engagement with one of said kingpin end portions, and means for compensating for an increase in clearance between said bearing surfaces due to wear by dispacing said bushing lontiduinally in a direction that causes said bushing internal surface to be urged toward engagement with said kingpin end portion, wherein said wear clearance compensating means comprises a cap closing said yoke bore, said cap having an annular portion projecting in said bore in abutting engagement with an end of said bushing, and at least one shim disposed between a mounting surface of said cap and a surface of said yoke, said shim being removable for taking up said wear clearance by causing said cap annular portion to engage said bushing end for dispacing said bushing in a direction causing engagement of said bushing bearing surface with said kingpin end portion when said cap is reinstalled.

12. A steering knuckle and kingpin assembly comprising a kingpin, means for fixedly mounting said kingpin on a support member, said kingpin having an upper end portion and a lower end portion, a wheel spindle knuckle pivotally mounted relative to said kingpin, said wheel spindle knuckle having an integral upper yoke having a bore disposed around said kingpin upper end portion and an integral lower yoke having a bore disposed around said kingpin lower end portion, a pair of bushings disposed in each of said bores in said yokes, at least one of said bushings having a peripheral surface fitted in said bore and an internal surface forming a bearing surface in engagement with one of said kingpin end portions, and means for compensating for an increase in clearance between said bearing surfaces due to wear by displacing said bushing longitudinally in a direction that causes said bushing internal surface to be urged toward engagement with said kingpin end portion, wherein said wear clearance compensating means comprises spring bias means constantly urging said bushing in the direction urging said bushing bearing surface toward engagement with said kingpin end portion, and wherein a cap is mounted over said bore for closing said bore, and said spring bias means is disposed between said cap and an end of said bushing.

13. The steering knuckle and kingpin assembly of claim 12 wherein said spring bias means is at least one Belleville-type spring.

14. A method for taking up clearance due to wear in a steering kingpin and knuckle assembly, said method comprising providing at least one end portion of said kingpin disposed in a bore of a yoke of said knuckle with a frusto-conical surface, disposing in said yoke bore a bushing having an internal frusto-conical surface corresponding to said kingpin frustoconical surface, and longitudinally adjusting said bushing relative to said kingpin for taking up the clearance due to wear between the peripheral surface of said kingpin end portion and the internal surface of said bushing.

15. The method of claim 14 wherein said wear clearance take up is effected by applying a spring bias force on an end of said bushing urging bearing surfaces between said bushing internal surface and said kingpin end portion surface in constant mutual engagement.

16. The method of claim 14 wherein said wear clearance take up is effected by providing an end cap for said yoke bore, said end cap having an annular portion projecting within said bore, said annular portion being engaged with an end of said bushing, removing said end cap, placing at least one annular shim on said end of said bushing, and replacing said end cap over said yoke bore.

17. The method of claim 14 wherein said wear clearance take up is effected by providing an end cap for said yoke bore, said end cap having a mounting flange and an annular portion projecting within said yoke bore, disposing at least one shim between said end cap mounting flange and a corresponding surface of said yoke, said annular portion being engaged with an end of said bushing, removing said end cap and at least one of said shims, and replacing said end cap over said yoke bore.

18. A method for taking up clearance due to wear in a steering kingpin and knuckle assembly, said method comprising providing at least one end portion of said kingpin disposed in a frusto-conical bore of a yoke of said knuckle with a cylindrical surface, disposing in said yoke bore a bushing having an external frusto-conical surface corresponding to said yoke bore frusto-conical surface, and longitudinally adjusting said bushing relative to said kingpin for taking up the clearance due to wear between the peripheral surfaace of said kingpin end portion and the internal surface of said bushing.

19. The method of claim 18 wherein said wear clearance take up is effected by applying a spring bias force on an end of said bushing urging bearing surfaces between said bushing internal surface and said kingpin end portion surface in constant mutual engagement.

20. The method of claim 18 wherein said wear clearance take up is effected by providing an end cap for said yoke bore, said end cap having an annular portion projecting within said bore, said annular portion being engaged with an end of said bushing, removing said end cap, placing at least one annular shim on said end of said bushing and replacing said end cap over said yoke bore.

21. The method of claim 18 wherein said wear clearance take up is effected by providing an end cap for said yoke bore, said end cap having a mounting flange and an annular portion projecting within said yoke bore, disposing at least one shim between said end cap mounting flange and a corresponding surface of said yoke, said annular portion being engaged with an end of said bushing, removing said end cap and at least one of said shims, and replacing said end cap over said yoke bore.

* * * * *